United States Patent
Liao et al.

(10) Patent No.: US 6,949,861 B1
(45) Date of Patent: Sep. 27, 2005

(54) CARBON BRUSH HOLDER

(76) Inventors: Su-Chen Liao, No. 27-3, Tung Chih Lane, Hsi Tun Area, Taichung (TW); Meng-Chiu Yu, No. 124, Tien Hsiang Street, North Area, Taichung (TW)

( * ) Notice: Subject to any disclaimer, the term of this patent is extended or adjusted under 35 U.S.C. 154(b) by 30 days.

(21) Appl. No.: 10/822,713

(22) Filed: Apr. 13, 2004

(51) Int. Cl.$^7$ .............................................. H01R 39/38
(52) U.S. Cl. .................... 310/239; 310/245; 310/249
(58) Field of Search ................................ 310/239, 245, 310/249

(56) References Cited

U.S. PATENT DOCUMENTS

| | | | | |
|---|---|---|---|---|
| 3,867,659 A | * | 2/1975 | Seaburg | 310/242 |
| 4,366,404 A | * | 12/1982 | Ziegler | 310/239 |
| 4,370,579 A | * | 1/1983 | Kobayashi et al. | 310/50 |
| 4,782,261 A | * | 11/1988 | Crevling et al. | 310/242 |
| 5,159,222 A | * | 10/1992 | Southall | 310/239 |
| 5,621,262 A | * | 4/1997 | Han | 310/239 |
| 5,631,513 A | * | 5/1997 | Coles et al. | 310/239 |
| 5,886,448 A | * | 3/1999 | Yoshida | 310/249 |
| 6,144,134 A | * | 11/2000 | Lin | 310/239 |

FOREIGN PATENT DOCUMENTS

| | | | | |
|---|---|---|---|---|
| JP | 353035102 A | * | 4/1978 | |
| JP | 2001238411 A | * | 8/2001 | |
| TW | 290200 | | 11/1996 | |
| TW | 292024 | | 11/1996 | |

* cited by examiner

*Primary Examiner*—Joseph Waks
(74) *Attorney, Agent, or Firm*—Bacon & Thomas PLLC

(57) ABSTRACT

A carbon brush holder includes a tubular copper conducting receptacle, a lead wire terminal riveted to the outside wall of the copper conducting receptacle, and an electrically insulative hollow holder base holding the copper conducting receptacle, the electrically insulative hollow holder base having an inside locating groove, which receives the bottom end of the lead wire terminal to hold the lead wire terminal in position.

10 Claims, 4 Drawing Sheets

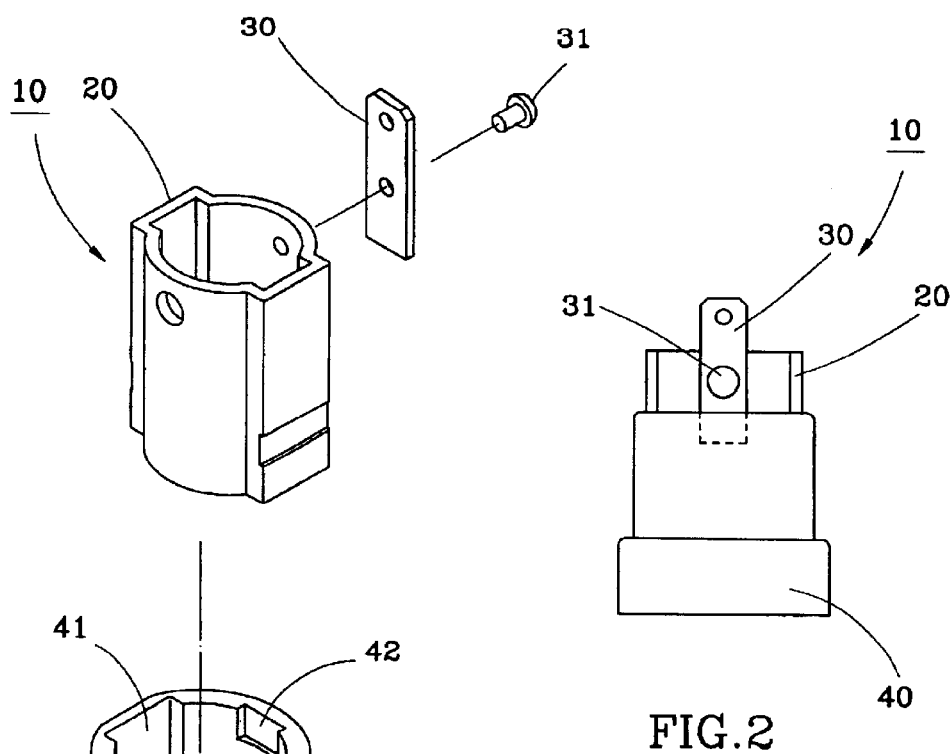
FIG.1
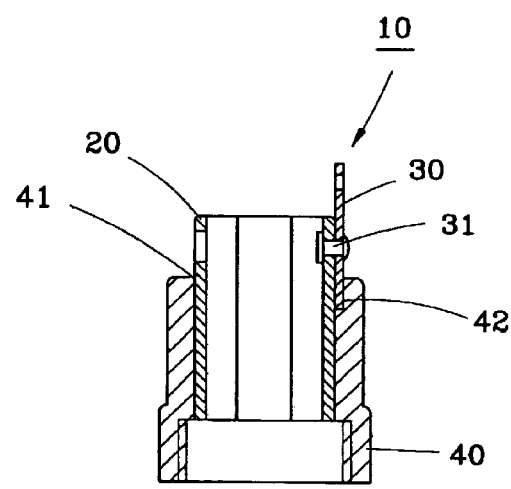
FIG.2
FIG.3

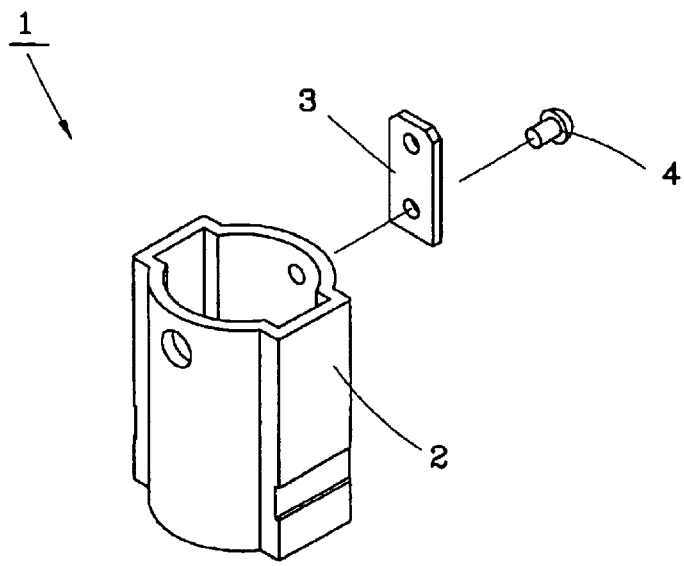
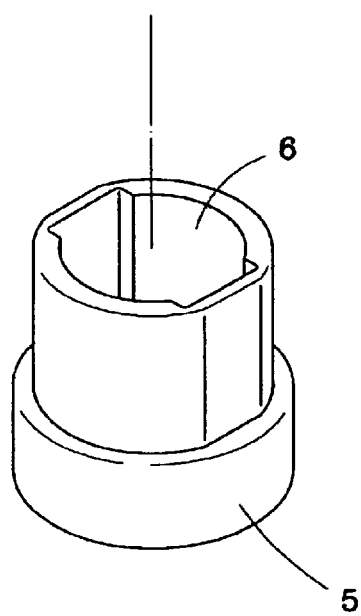
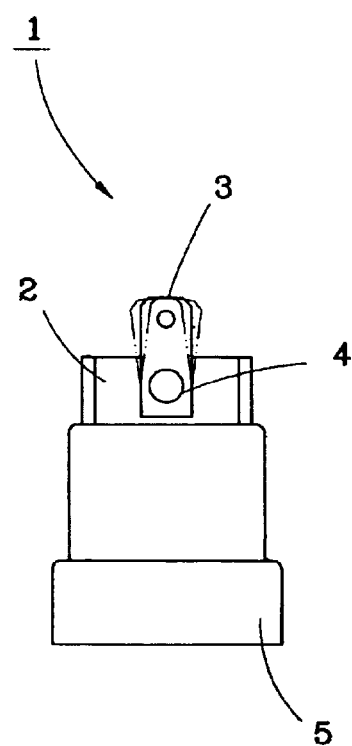
FIG.11
FIG.12

CARBON BRUSH HOLDER

BACKGROUND OF THE INVENTION

1. Field of the Invention

The present invention relates to the internal mechanism of a motor and more particularly, to a carbon brush holder for motor.

2. Description of the Related Art

Taiwan utility model no. 290200 discloses a carbon brush holder, which comprises a copper conducting receptacle and a holder base. The copper conducting receptacle is made from a copper sheet material by stamping, having an upwardly protruded lead wire connection strip. The holder base has a vertical receiving hole. The copper conducting receptacle is fastened to the receiving hole of the holder base, keeping the lead wire connection strip extended to the outside of the holder base. Because the copper conducting receptacle is made from a copper sheet material by stamping, the wall thickness of the copper conducting receptacle is limited. Therefore, this design of carbon brush holder is not suitable for large current application.

Taiwan utility model no. 292024 discloses another structure of carbon brush holder. According to this design, the carbon brush holder comprises a copper conducting receptacle and a holder base holding the copper conducting receptacle. The copper conducting receptacle is made from a copper sheet material by stamping, having a lead wire connection upwardly protruded from the top side and a locating portion protruded from the outside4 wall. The holder base has a stop portion for stopping against the locating portion of the copper conducting receptacle after insertion of the copper conducting receptacle into the holder base. Similar to the aforesaid prior art design, this structure of carbon brush holder is not suitable for large current application.

FIGS. 11 and 12 show a conventional carbon brush holder 1 that fits for large current application. The carbon brush holder 1 comprises a copper conducting receptacle 2, which is extruded from copper and has a tubular configuration, a lead wire terminal 3 which is fastened to the top side of the outside wall of the copper conducting receptacle 2 with a rivet 4 and has a rectangular configuration, and an electrically insulative holder base 5, which comprises a upwardly extended vertical receiving hole 6 fitting the copper conducting receptacle 2. The wall thickness of the copper conducting receptacle 2 is determined subject to the required large current load. During actual practice, the upper part of the lead wire terminal 3 protruding over the top side of the copper conducting receptacle 2 is bent outwards for the connection of a lead wire. However, because the lead wire terminal 3 is fastened to the copper conducting receptacle 2 with a rivet 4, bending the upper part of the lead wire terminal 3 outwards causes loosening of the lead wire terminal 3 (see FIG. 12). Loosening of the lead wire terminal 3 may result in a short circuit.

SUMMARY OF THE INVENTION

The present invention has been accomplished under the circumstances in view. It is the main object of the present invention to provide a carbon brush holder, which keeps the lead wire terminal positively positioned in position against biasing force.

To achieve this and other objects of the present invention, the carbon brush holder comprises an electrically insulative holder base, the electrically insulative holder base comprising an upwardly extended vertical receiving hole; a copper conducting receptacle tightly press-fitted into the vertical receiving hole of the electrically insulative holder base, the copper conducting receptacle having a tubular configuration; and a lead wire terminal riveted to an outside wall of an upper part of the copper conducting receptacle; wherein the electrically insulative holder base comprises an inside locating groove upwardly extended to a top side thereof for the positioning of the lead wire terminal upon insertion of the copper conducting receptacle into the vertical receiving hole of the electrically insulative holder base.

BRIEF DESCRIPTION OF THE DRAWINGS

FIG. 1 is an exploded view of a carbon brush holder according to a first embodiment of the present invention.

FIG. 2 is a plain assembly view of the carbon brush holder according to the first embodiment of the present invention.

FIG. 3 is a sectional view taken along line 3—3 of FIG. 2.

FIG. 11 is an exploded view of a carbon brush holder according to the prior art.

FIG. 12 is a plain assembly view of the prior art carbon brush holder shown in FIG. 11.

DETAILED DESCRIPTION OF THE INVENTION

Figure 4:
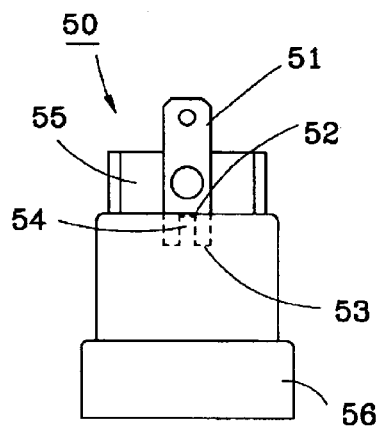
FIG. 4 is a plain assembly view of a carbon brush holder according to a second embodiment of the present invention.

Referring to FIG. 1, a carbon brush holder 10 in accordance with the first embodiment of the present invention is shown comprising a copper conducting receptacle 20, which is extruded from copper and has a tubular configuration, a lead wire terminal 30, which is fastened to the top side of the outside wall of the copper conducting receptacle 20 with a rivet 31 and has a rectangular configuration, and an electrically insulative holder base 40 injection-molded from plastics, which comprises a upwardly extended vertical receiving hole 41 fitting the copper conducting receptacle 20, and a rectangular locating groove 42 formed inside the receiving hole 41 and extended to the top.

The copper conducting receptacle 20 is press-fitted into the receiving hole 41 of the electrically insulative holder base 40, keeping the lower part of the lead wire terminal 30 engaged in the locating groove 42 and the upper part of the lead wire terminal 30 protruding over the topmost edge of the electrically insulative holder base 40.

As indicated above, the locating groove 42 holds the lead wire terminal 30 firmly in place, preventing loosening of the lead wire terminal 30 from the copper conducting receptacle 20 upon stretching of the lead wire, which is connected to the lead wire terminal 30. Therefore, the invention prevents electric shock due to loosening of the lead wire terminal 30. Further, because the electrically insulative holder base 40 is injection-molded from plastics, it is easy to make a cavity in the mold for the locating groove 42. Therefore, the manufacturing of the carbon brush holder 10 is simple, and its manufacturing cost is low.

The lead wire terminal and the locating groove may be made in a different form to have the lead wire terminals positively secured to the copper conducting receptacle 20.

In the carbon brush holder, referenced by 50, of the second embodiment of the present invention as shown in FIG. 4, the lead wire terminal, referenced by 51, has a bottom positioning notch 52, and the electrically insulative holder base, referenced by 56, has an inside locating groove 53 at the top and an inside locating rod 54 suspended in the locating groove 53. Upon insertion of the copper conducting receptacle, referenced by 55, into the electrically insulative holder base 56, the lead wire terminal 51 is plugged into the inside locating groove 53 to force the bottom positioning notch 52 into engagement with the inside locating rod 54.

Figure 5:
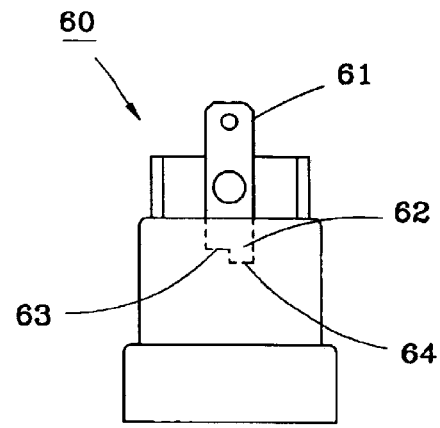
FIG. 5 is a plain assembly view of a carbon brush holder according to a third embodiment of the present invention.

In the carbon brush holder, referenced by 60, of the third embodiment of the present invention as shown in FIG. 5, the lead wire terminal, referenced by 61, has a bottom protruding portion 62, and the electrically insulative holder base of the carbon brush holder 60 has an inside locating groove 63 at the top and a recessed portion 64 in the locating groove 63 for receiving the bottom protruding portion 62 of the lead wire terminal 61 upon insertion of the bottom end of the lead wire terminal 61 into the inside locating groove 63.

Figure 6:
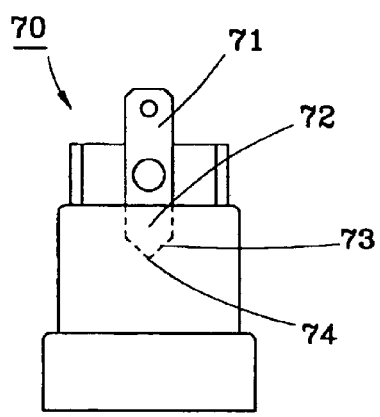
FIG. 6 is a plain assembly view of a carbon brush holder according to a fourth embodiment of the present invention.

In the carbon brush holder, referenced by 70, of the fourth embodiment of the present invention as shown in FIG. 6, the lead wire terminal, referenced by 71, has a pointed bottom end 72, and the electrically insulative holder base of the carbon brush holder 70 has an inside locating groove 73 with a bottom end 74 made gradually reduced toward the bottom side to fit the pointed bottom end 72 of the lead wire terminal 71.

In the aforesaid embodiments, the bottom end of the lead wire terminal fits the configuration of the inside locating groove of the electrically insulative holder base so that the lead wire terminal can positively be positioned in the inside locating groove of the electrically insulative holder base.

Figure 7:
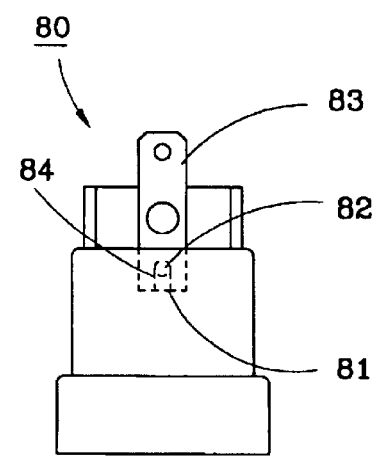
FIG. 7 is a plain assembly view of a carbon brush holder according to a fifth embodiment of the present invention.

In the carbon brush holder, referenced by 80, of the fifth embodiment of the present invention as shown in FIG. 7, the electrically insulative holder base of the carbon brush holder 80 has an inside locating groove 81 and a raised portion 82 suspended in the inside locating groove 81; the lead wire terminal, referenced by 83, has a guide groove 84 upwardly extended from the bottom end for receiving the raised portion 82 upon insertion of the lead wire terminal 83 into the inside locating groove 81.

Figure 8:
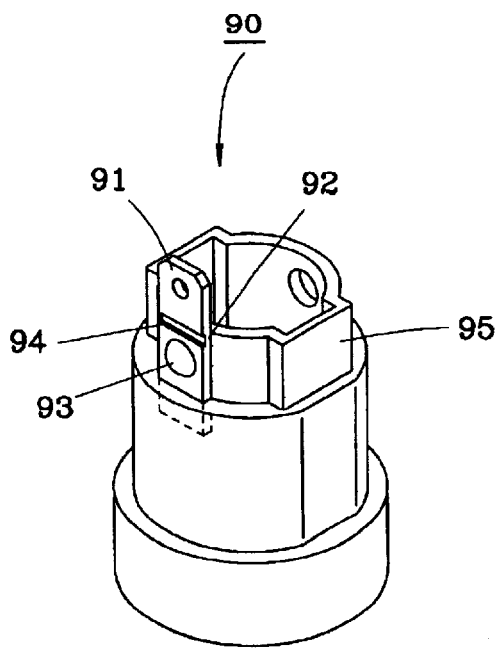
FIG. 8 is a perspective assembly view of a carbon brush holder according to a sixth embodiment of the present invention.
Figure 9:
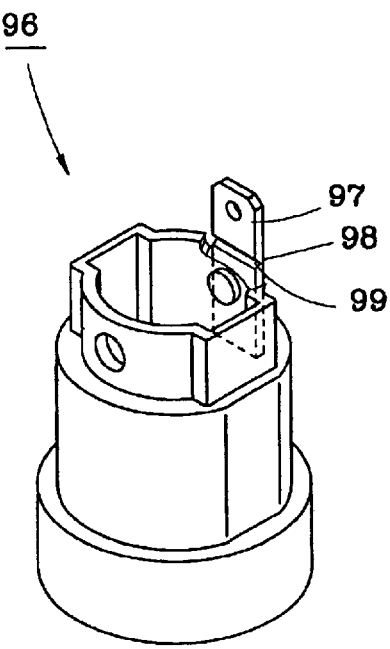
FIG. 9 is a perspective assembly view of a carbon brush holder according to a seventh embodiment of the present invention.

In the carbon brush holder, referenced by 90, of the sixth embodiment of the present invention as shown in FIG. 8, the lead wire terminal, referenced by 91, is fastened to the copper conducting receptacle 95 with a rivet 93, having a narrow thin-wall portion 92 transversely disposed on the middle above the rivet 93. Making a transverse groove 94 on the lead wire terminal 91 by stamping forms the thin-wall portion 92. The thin-wall portion 92 stops or reduces transmission of biasing force to the rivet 93 when the lead wire terminal 91 is bent In the carbon brush holder, referenced by 96, of the seventh embodiment of the present invention as shown in FIG. 9, making a narrow transverse cut 99 on the lead wire terminal, referenced by 97, forms a thin-wall portion 98 in the lead wire terminal 97. The narrow transverse cut 99 can be made on either of the two opposite sides of the lead wire terminal 97.

Figure 10:
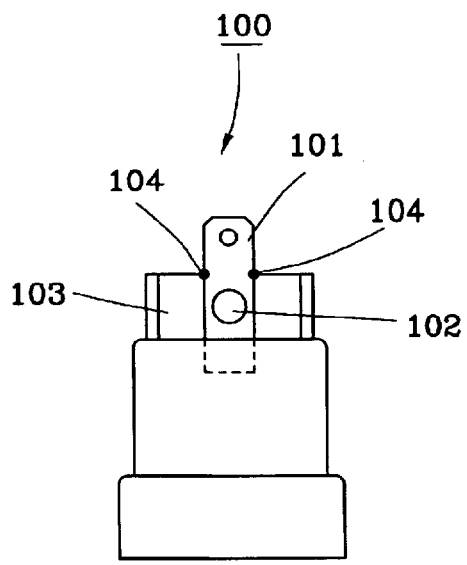
FIG. 10 is a plain assembly view of a carbon brush holder according to an eighth embodiment of the present invention.

In the carbon brush holder, referenced by 100, of the eighth embodiment of the present invention as shown in FIG. 10, the lead wire terminal, referenced by 101, is fastened to the copper conducting receptacle, referenced by 103, with a rivet 102, having two bonding points 104 disposed at two opposite lateral sides above the rivet 102 and respectively welded to the copper conducting receptacle 103. Because the lead wire terminal 101 is welded to the copper conducting receptacle 103 after having been riveted, the bonding strength between the lead wire terminal 101 and the copper conducting receptacle 103 is reinforced, and electric current can be transmitted to the copper conducting receptacle 103 through the lead wire terminal 101 stably.

Further, after the lead wire terminal has been riveted to the copper conducting receptacle and inserted with the copper conducting receptacle into the electrically insulative holder base, the distance between an outer side of said lead wire terminal and an inner side of said inside locating groove is smaller than 0.1 mm.

A prototype of carbon brush holder has been constructed with the features of FIGS. 1~10. The carbon brush holder functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A carbon brush holder comprising:
    an electrically insulative holder base, said electrically insulative holder base comprising an upwardly extended vertical receiving hole;
    a copper conducting receptacle tightly press-fitted into the vertical receiving hole of said electrically insulative holder base, said copper conducting receptacle having a tubular configuration; and
    a lead wire terminal riveted to an outside wall of an upper part of said copper conducting receptacle;
    wherein said electrically insulative holder base comprises an inside locating groove upwardly extended to a top side thereof for the positioning of said lead wire terminal upon insertion of said copper conducting receptacle into said vertical receiving hole of said electrically insulative holder base.

2. The carbon brush holder as claimed in claim 1, wherein said lead wire terminal has a rectangular configuration; said inside locating groove of said electrically insulative holder base has a rectangular configuration fitting said lead wire terminal.

3. The carbon brush holder as claimed in claim 1, wherein said lead wire terminal has a bottom positioning notch; said electrically insulative holder base comprises an inside locating rod suspended in said inside locating groove and engaged into said bottom positioning notch of said lead wire terminal.

4. The carbon brush holder as claimed in claim 1, wherein said electrically insulative holder base comprises a recessed portion in said inside locating groove; said lead wire terminal has a bottom protruding portion engaged into said recessed portion of said electrically insulative holder base.

5. The carbon brush holder as claimed in claim 1, wherein said inside locating groove of said electrically insulative holder base has a bottom end made gradually reduced toward a bottom side; said lead wire terminal has a pointed bottom end fitting the gradually reduced bottom end of said inside locating groove.

6. The carbon brush holder as claimed in claim 1, wherein said electrically insulative holder base has a raised portion suspended in said inside locating groove; said lead wire terminal has a guide groove upwardly extended from a bottom end thereof and adapted to receive said raised portion of said electrically insulative holder base upon insertion of said lead wire terminal into said inside locating groove.

7. The carbon brush holder as claimed in claim 1, wherein said lead wire terminal has a narrow thin-wall portion transversely disposed on a middle part thereof above the riveted point of said lead wire terminal to said copper conducting receptacle.

8. The carbon brush holder as claimed in claim 7, wherein said lead wire terminal has a transverse groove transversely disposed above the riveted point of said lead wire terminal to said copper conducting receptacle, defining said thin-wall portion.

9. The carbon brush holder as claimed in claim 1, wherein said lead wire terminal has two bonding points disposed at two opposite lateral sides above the riveted point of said lead wire terminal to said copper conducting receptacle and respectively welded to said copper conducting receptacle.

10. The carbon brush holder as claimed in claim 1, wherein the distance between an outer side of said lead wire terminal and an inner side of said inside locating groove is smaller than 0.1 mm.

* * * * *